(12) United States Patent
Gordon et al.

(10) Patent No.: US 12,380,105 B2
(45) Date of Patent: Aug. 5, 2025

(54) QUERY CACHED FILTER

(71) Applicant: VAST DATA LTD., Tel Aviv (IL)

(72) Inventors: Eyal Gordon, Tel Aviv (IL); Oren Ashkenazi, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/655,556

(22) Filed: Mar. 21, 2022

(65) Prior Publication Data

US 2023/0297574 A1 Sep. 21, 2023

(51) Int. Cl.
*G06F 16/00* (2019.01)
*G06F 16/22* (2019.01)
*G06F 16/2453* (2019.01)

(52) U.S. Cl.
CPC ........ *G06F 16/24545* (2019.01); *G06F 16/22* (2019.01); *G06F 16/24539* (2019.01)

(58) Field of Classification Search
CPC ............... G06F 16/24545; G06F 16/22; G06F 16/24539
See application file for complete search history.

(56) References Cited

U.S. PATENT DOCUMENTS

| | | | |
|---|---|---|---|
| 2010/0228935 A1* | 9/2010 | Fienblit | G06F 16/119 711/E12.103 |
| 2016/0012108 A1* | 1/2016 | Hu | G06F 16/24532 707/771 |
| 2017/0046367 A1* | 2/2017 | Chang | G06F 16/215 |
| 2021/0256079 A1* | 8/2021 | Zhu | G06F 16/2452 |

FOREIGN PATENT DOCUMENTS

CN 114020790 A * 2/2022

\* cited by examiner

*Primary Examiner* — Dinku W Gebresenbet
(74) *Attorney, Agent, or Firm* — Reches Patents

(57) ABSTRACT

A method for responding to a query, the method may include (a) receiving, by a storage system compute element, a query that comprises one or more conditions related to a content of at least one data unit (DU); (b) searching, based on the one or more conditions and on a condition fulfillment information (CFI), for one or more irrelevant groups of DUs to be skipped during the responding to the query; wherein the one or more irrelevant groups of DUs belong to multiple stored groups of DUs that are stored in the storage system; wherein an irrelevant group of DU does not comprise, according to the CFI, any DU that fulfills the one or more conditions; and (c) generating a response to the query based on an outcome of the searching.

18 Claims, 4 Drawing Sheets

QUERY CACHED FILTER

TECHNICAL FIELD

The present disclosure generally relates to the field of data storage, and more particularly to a query cached filter.

BACKGROUND

Database queries often specify conditions for fetching data from identified columns of one or more tables. For example, the SQL WHERE clause specifies a condition, and may be part of a Select-statement, Update-statement or Delete-Statement. Only those records that fulfill the specified condition are extracted.

A predicate is a condition expression that evaluates to a Boolean value, either true or false. WHERE clause or HAVING clause includes predicates to determine which rows are relevant to a particular query.

A database is composed of tables that arrange data elements in vertical columns and horizontal rows. Values are stored in cells, wherein a cell is formed by the intersection of a column and row.

There is a growing need to provide an efficient method to respond to queries.

SUMMARY

There may be provided a storage system, a method and a non-transitory computer readable medium for responding to queries.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
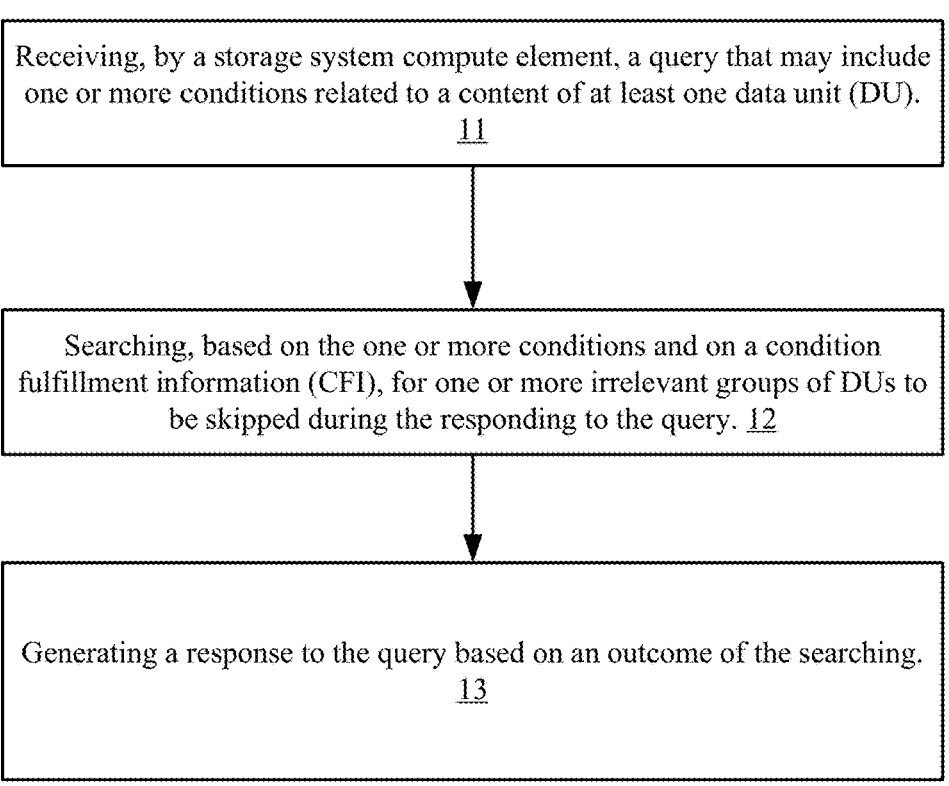
FIG. 1 is an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a controller. The controller can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

FIG. 1 illustrates method 10 for responding to a query.

Method 10 may start by step 11 of receiving, by a storage system compute element, a query that may include one or more conditions related to a content of at least one data unit (DU). The content of the at least one data unit may be values stored in cells of a table's column.

Step 11 may be followed by step 12 of searching, based on the one or more conditions and on a condition fulfillment information (CFI), for one or more irrelevant groups of DUs (data units) to be skipped during the responding to the query.

The one or more irrelevant groups of DUs belong to multiple stored groups of DUs that are stored in the storage system. For example—a group of DUs may include multiple fields (cells) of a column of a tabular data structure.

An irrelevant group of DU may not include, according to the CFI, any DU that fulfills the one or more conditions.

Step 12 may be followed by step 13 of generating a response to the query based on an outcome of the searching.

The multiple stored groups of DUs may include other groups of DUs that differ from the one or more irrelevant groups and the CFI is indicative of such groups.

These other groups of DUs may include one or more relevant groups of DUs.

Additionally or alternatively, these other groups of DUs may include conditionally relevant groups of DUs.

A conditionally relevant group of DU may be identified as such by the CFI.

Alternatively, the CFI alone does not distinguish between a relevant group of DUs and a conditionally relevant group of CUs—but marks both types of groups as relevant.

A conditionally relevant group of CU may be associated within one or more group filters that may be used to determine whether there is a need to search the group. For example—one or more group filters may provide information about the range of values of the DUs of the conditionally relevant group—and if the one or more conditions relate to values outside the range—the method may skip searching the conditionally relevant group.

When the CFI indicates that a group of DUs is a relevant group of DUs—then step 13 may include searching that (relevant) group of DUs for one or more DUs that fulfill the one or more conditions. Additionally or alternatively—when the one or more conditions are a plurality of conditions—then step 13 may include (a) perform a separate initial search for each one (or some of) of the plurality of conditions and then "merge" the outcomes of the initial searches.

When the CFI indicates that a group of DUs is a conditionally relevant group of DUs then the one or more filters associated with the group may be checked to determine whether to search the conditionally relevant group of DUs or not.

The method may decide the size of a group of DUs to be represented as a group in the CFI. The method may dynamically change a size of the groups of DUs. It should be noted that different conditions may be associated with different priorities—and groups of higher priority can be smaller than groups of lower priority. The priority can be determined in any manner—dynamically, fixed, by a user, according to a SLA, and the like. Additionally or alternatively—the priority can determine which conditions are represented in the CFI.

The CFI may be cached.

Figure 2:
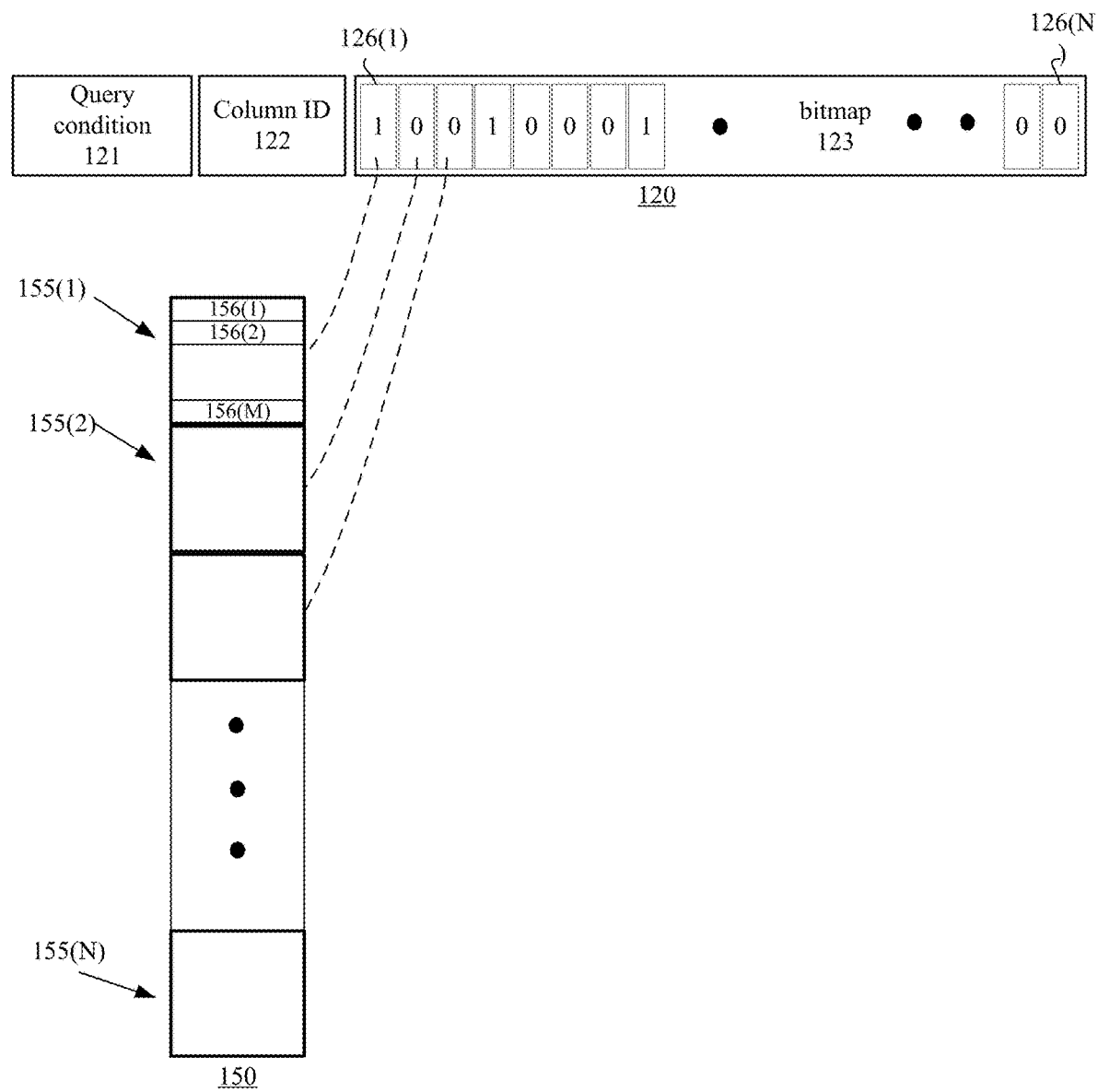
FIG. 2 is an example of data structures.
Figure 3:
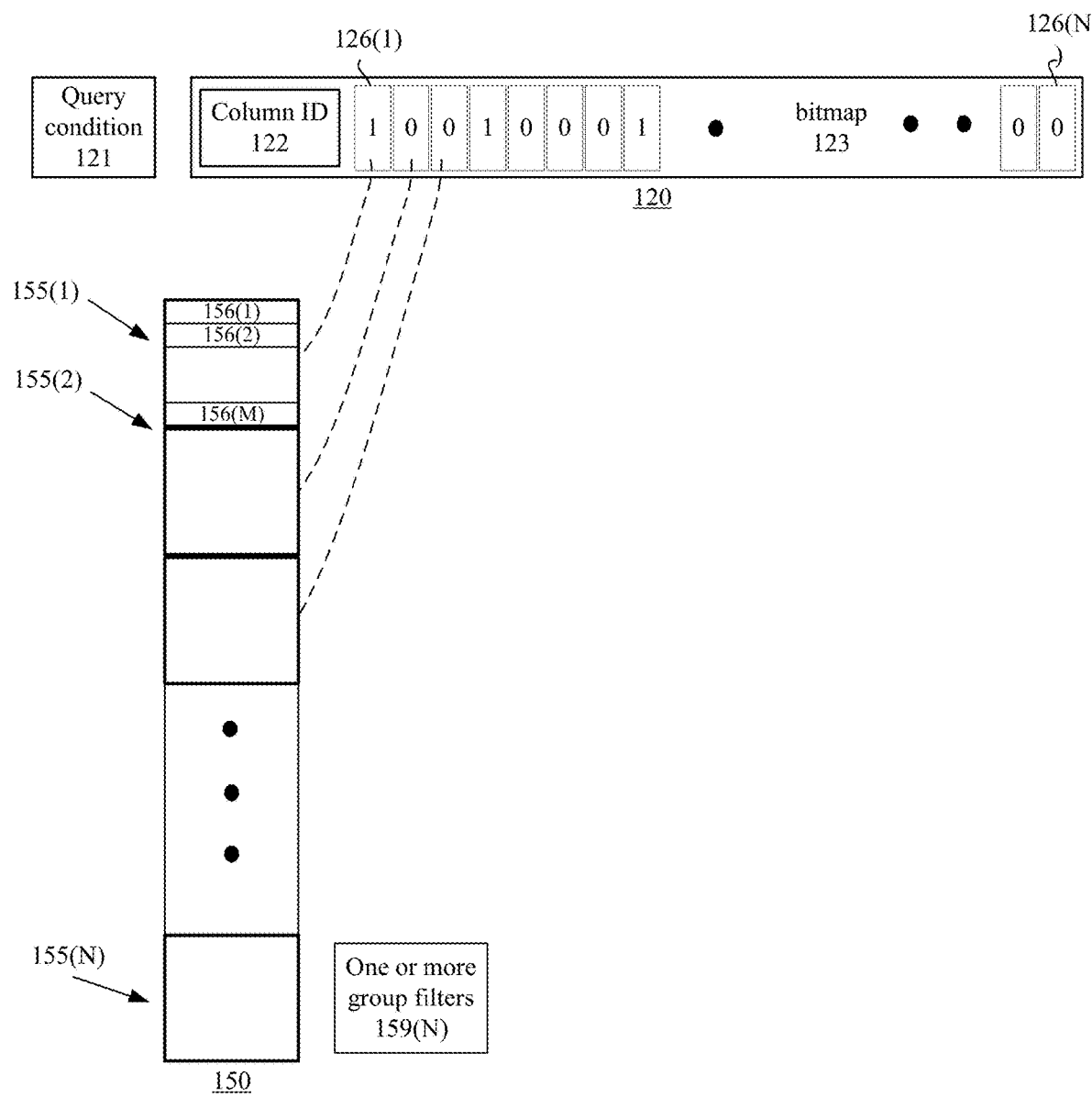
FIG. 3 is an example of data structures.
Figure 4:
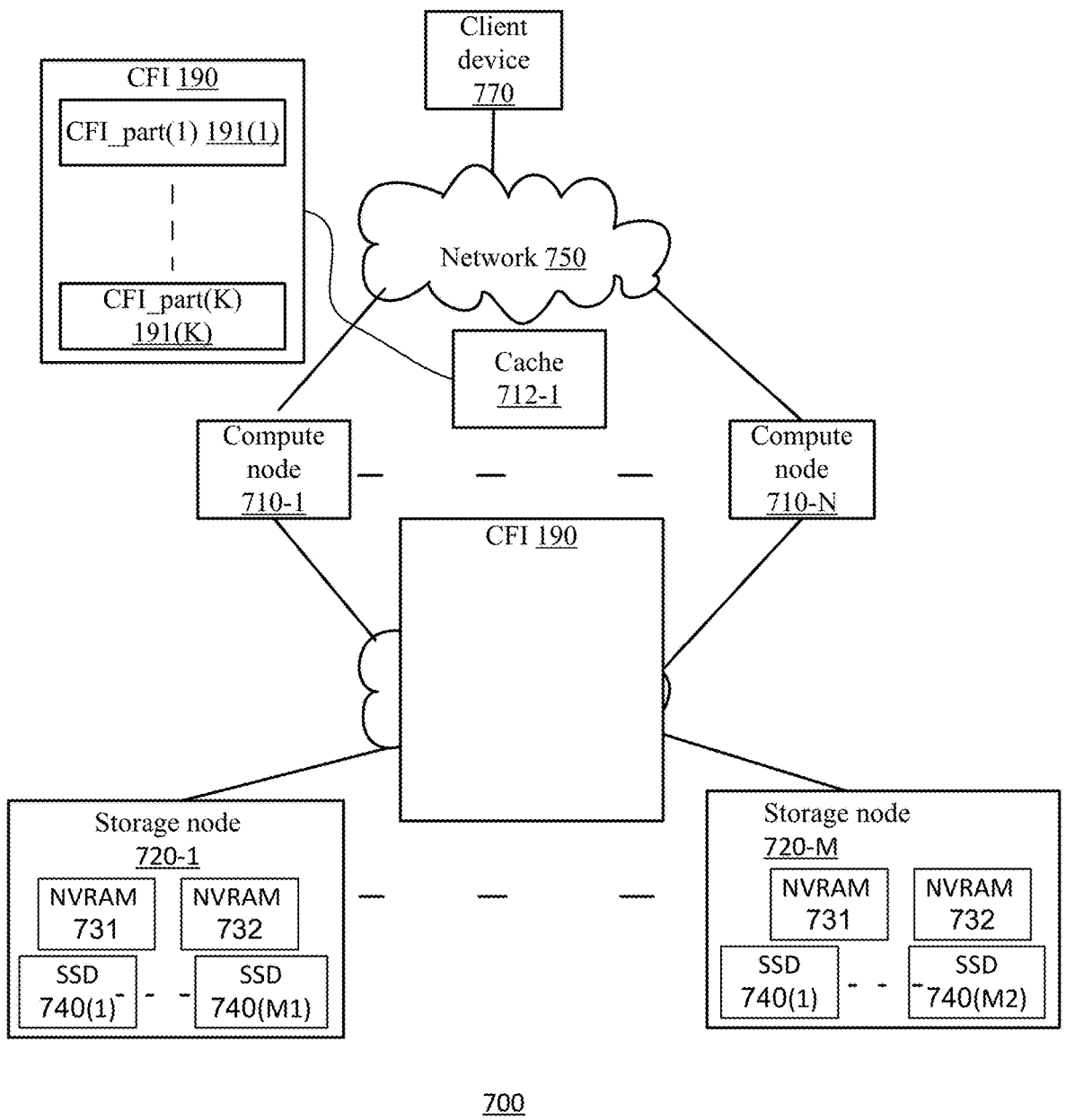
FIG. 4 is an example of a storage system.

The CFI may include information about a set of conditions. FIG. 4 illustrates CFI 190 as being cached and include K parts 191(1)-191(K)—one part per one or more conditions. FIGS. 2 and 3 illustrates a part of CFI allocated to a single condition. The set of conditions may include any number of CFI parts—for example between 5-100, between 10-50, between 50-500, and more.

The CFI may include a set of CFI items for each of at least one condition of the CFI. Thus—a set of CFI items may be allowed to a single condition or to a combination of at least two conditions.

Different CFI items of the set of CFI items are associated with different stored groups of DUs. The multiple stored groups of DUs are included in a tabular data structure and each set of CFI items is associated with at least one column identifier—especially when a column is associated with a certain variable.

According to an example—set of CFI items is a bitmap. An example of such as bit map is illustrated in FIG. 2.

The caching is based on assumption that that queries are not fully random, and often repeat themselves.

Certain queries and hints for building responses to the certain queries may be cached in a cache memory of a storage system that manages a database. The cached query may include condition information of the original query, for example: the text of the condition (e.g., a predicate "where X>10"), a hashed value of this text, or tuples of operators and operands.

The cached query is associated with a CFI, e.g., a filter that includes fulfillment indication (CFI items) per each group of cells, that will assist in responding to subsequent queries that include the same condition. A group of cell includes multiple cells. The filter may be a bitmap, where each bit covers a range of consecutive cells included in a group, stored in consecutive row indices in the column referred to by the query (e.g., column X). A value '0' may indicate that the corresponding group of cells definitely does not include values that satisfy the condition, and a value '1' means that one or more of the group of cells of the column satisfy the condition, or at least that there may be such a value, and a further scan needs to be conducted, to extract the relevant cells.

FIG. 2 illustrates a cached query filter 120 and a table column 150 related to the cached query filter 120. Column 150 is divided into multiple N groups of cells 155. A cell is an example of a DU. For example, a group of cells 155(1) includes M cells 156(1) to 156(M). M may be for example 1024, 2048, etc. FIG. 3 illustrates an example in which the column ID field is part of the bitmap and also illustrates one or more group filters 190(N) associated with cell 155(N)—making cell 155(N) a conditionally potential cell—and its one or more group filters are checked before searching the cell itself.

A cached query filter 120 includes the query condition information 121, one or more column identity 122, and a filter that includes a bitmap 123. Each bit in the bitmap represents a group of values (in cells) in the column identified by column ID 122.

For example, bit 126(1) represents the group of cells 155(1) as indicated by the dashed connecting line. The bit 126(1) is set to '1' to indicate that at least one value in the group of cells 155(1) may satisfy the query condition 121 (or—that at least a more in-depth scan needs to be performed). Bit 126(N) represents the group of cells 155(N). Bit 126(N) is reset ('0') to indicate that none of the values in the group of cells 155(N) satisfies the query condition 121, and in this case a thorough scan of the group of values 155(N) can be skipped.

The number of cells in the group may be selected according to system preferences. For example, if the space of the cached queries needs to be preserved (e.g., when the number of queries needed to be cached is elevated), then each group of cells may include a larger number of cells, so as to reduce the size of the bitmap. On the other hand, if computing time (related to scanning more values) needs to be reduced, then each group includes a smaller number of cells.

When receiving a query that includes a condition (e.g., SQL command that includes "where [condition]"), the condition is searched in the cache. If a cached query filter is found for the condition, then a scan can be skipped for any group of cells associated with a bit value indicating that no value in the group satisfies the condition. For example, the second group of cells 155(2), as well as the third, fifth-seventh, (n-1)th and nth group of cells—can be skipped, as they are associated with a reset bit in the bitmap. A scan is performed only for groups of cells associated with a bitmap value indicating that there may be at least one value that satisfies the condition.

When a scan is performed for a group of cells associated with a bit value indicating that there may be at least one value that satisfies the condition, but no such value is found during the scan, then the bitmap is updated to reflect that no value satisfies the condition for the group of cells. For example, if none of the values of cells 156(1)-156(M), of the first group of cells 155(1), satisfies the condition, then the bit 126(1) is changed from '1' to '0'.

If no cached query is found in the cache, a thorough scan is performed, and the query along with the query filter, that is built during the scan, may be cached, for aiding subsequent queries. If, for some reason, only part of the column was scanned, then the non-scanned groups of cells will be associated with '1', to indicate the need to scan these cells in subsequent queries. Method 12 may include looking up the cache memory for a CFI that is associated with the one or more conditions of the query, and may perform step 12 of searching for irrelevant groups of DUs, based on the conditions and the CFI—if a CFI was found. In a case where a CFI was not found, method 12 may include building the CFI during the scan and storing the CFI in the cache memory, to be used by subsequent query responses.

The determination of whether to cache the query filter may depend, for example, on the number of times the query condition was detected in incoming queries during a certain time window, the frequency, or any other condition for caching.

When updating a cell in the table, a cached query is searched for the corresponding column. If a cached query is found and the bit that corresponds to the group of the cell indicates that no value in the corresponding group satisfies the condition, then it is determined if the new value of the cell does satisfy the condition. If so—the bitmap is updated to indicate that the corresponding group of cells includes at least one value that satisfies the condition.

For example, suppose the cached query found during an update of a cell includes a condition ">10", the updated cell is a cell in a column indicated in column ID 122, where the updated cell is part of group of cells 155(N) that is indicated (bit 126(N)) as not including any value satisfying the condition, and the new value is '15'. The bit 126(N) is set to '1' to indicate that the group of cells 155(N) will need to be scanned on subsequent queries that include the condition ">10" for the specific column.

The condition of the cached query may include multiple predicates, for example: "X>10 and Y<8". In this case, more than one column ID 122 will be included in the cached query, and each bit will reflect the result of the compound condition.

A thorough scan of a group of cells may include either a full scan of the group that requires checking the value of each cell, or may include using filters exist for the group of cells, for example minimum and maximum filters, so as to further examine whether there is a need to scan the entire group, or whether the group can be skipped, since the requested values indicated in the condition are out of the range indicated by the minimum-maximum filter.

FIG. 4 illustrates a storage system 700 that includes cache 712-1, storage system compute elements such as multiple (N) compute nodes 710-1 to 710-N and storage resources such as multiple (M) storage nodes 720-1 to 720-M. The cache 712-1 may be part of one or more compute nodes or one or more storage nodes.

The compute nodes implement the logic of the storage system and are configured to execute method 10. The compute nodes communicate with the storage nodes via a network, such as fabric 760, and with one or more clients, such as client device 770, via network 750, may receive database queries from client device 770 and send the queries responses to client device 770. The storage nodes include various storage devices, such as NVRAM (Non Volatile Random Access Memory) 731 and 732, SSDs (Solid State Drives) 740(1)-740(M1) of storage node 720-1, and SSDs 740(1)-740(M2) of storage node 720-2. The database tables are stored in various storage devices of the storage nodes. The storage system compute element may be a compute node or a compute entity (e.g., a processor) within the compute node.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic DSs are merely illustrative and that alternative embodiments may merge logic DSs or circuit elements or impose an alternate decomposition of functionality upon various logic DSs or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for responding to a query, the method comprises:
   receiving, by a storage system compute element, a query that comprises one or more conditions related to a content of at least one data unit (DU) that is stored in the storage system;
   looking up query filters, stored in a memory of the storage system, for a stored query filter that includes at least one condition that matches the one or more conditions, wherein the stored query filter further includes a condition fulfillment information (CFI) about relevant groups of DUs and irrelevant groups of DUs with respect to the at least one condition; wherein an irrelevant group of DUs is a group that definitely does not comprise, according to the CFI, any DU that fulfills the one or more conditions, and wherein a relevant group of DUs is a group that potentially includes at least one DU that fulfills the one or more conditions:
   when finding the stored query filter:
   (a) skipping one or more irrelevant groups of DUs during the responding to the query, without searching for DUs within the one or more irrelevant groups, for fulfillment of the one or more conditions;
   (b) searching, within one or more relevant groups of DUs for DUs that fulfill the one or more conditions; wherein the one or more irrelevant groups of DUs and the one or more relevant groups of DUs belong to multiple stored groups of DUs that are stored in the storage system; and
   (c) generating a response to the query based on an outcome of the searching.

2. The method according to claim 1 comprising dynamically changing a size of the groups of DUs.

3. The method according to claim 1 wherein the CFI is cached.

4. The method according to claim 1 wherein the stored query filter comprises information about a set of conditions.

5. The method according to claim 4 wherein the stored query filter comprises a set of CFI items for each of the at least one condition, wherein different CFI items of the set of CFI items are associated with different stored groups of DUs.

6. The method according to claim 5 wherein the multiple stored groups of DUs are included in a tabular data structure.

7. The method according to claim 6, wherein each set of CFI items is associated with at least one column identifier.

8. The method according to claim 4 wherein the set of CFI items is a bitmap.

9. The method according to claim 1 wherein the multiple stored groups of DUs also comprise one or more conditionally relevant groups of DUs to be, according to the CFI, searched during a responding to the query; and wherein the generating of the response comprises conditionally searching the one or more relevant groups of DUs for one or more DUs that fulfill the one or more conditions.

10. The method according to claim 1 wherein the multiple stored groups of DUs also comprise one or more conditionally relevant groups of DUs to be, according to the CFI, searched during a responding to the query; and wherein the generating of the response comprises conditionally searching the one or more relevant groups of DUs for one or more DUs that fulfill the one or more conditions.

11. The method according to claim 10 wherein a conditionally relevant group of DUs is associated with a group filter that comprises group data unit metadata regarding values of data units within the conditionally relevant group of DU; wherein the conditionally searching comprises checking, based on the group filter whether to search the conditionally relevant group of DUs or not.

12. The method according to claim 10 wherein the group filter is indicative of a range of values of DUs of the conditionally relevant group of DUs.

13. A non-transitory computer readable medium for responding to a query, the non-transitory computer readable medium stores instructions for:
   receiving, by a storage system compute element, a query that comprises one or more conditions related to a content of at least one data unit (DU) that is stored in the storage system;
   looking up query filters stored in a memory of the storage system for a stored query filter that includes at least one condition that matches the one or more conditions, wherein the stored query filter further includes a condition fulfillment information (CFI) about relevant groups of DUs and irrelevant groups of DUs with respect to the at least one condition; wherein an irrelevant group of DUs is a group that definitely does not comprise, according to the CFI, any DU that fulfills the one or more conditions, and wherein a relevant group of DUs is a group that potentially includes at least one DU that fulfills the one or more conditions;
   when finding the stored query filter:
   (a) skipping one or more irrelevant groups of DUs to be skipped during the responding to the query, without searching for DUs within the one or more irrelevant groups, for fulfillment of the one or more conditions;
   (b) searching, within one or more relevant groups of DUs for DUs that fulfill the one or more conditions;

wherein the one or more irrelevant groups of DUs and the one or more relevant groups of DUs belong to multiple stored groups of DUs that are stored in the storage system; and (c) generating a response to the query based on an outcome of the searching.

14. The non-transitory computer readable medium according to claim 13 that stores instruction for dynamically changing a size of the groups of DUs.

15. The non-transitory computer readable medium according to claim 13 wherein the CFI is cached.

16. The non-transitory computer readable medium according to claim 13 wherein the stored query filter comprises information about a set of conditions.

17. The non-transitory computer readable medium according to claim 16 wherein the stored query filter comprises a set of CFI items for each of the at least one condition, wherein different CFI items of the set of CFI items are associated with different stored groups of DUs.

18. A storage system that comprises cache, storage resources and a storage system compute element;
wherein the cache is configured to store query filters;
wherein the storage element are configured to store stored groups of data units (DUs), and
wherein the storage system compute element is configured to:

receive a query that comprises one or more conditions related to a content of at least one DU that is stored in the storage system;
lookup the query filters for a stored query filter that includes at least one condition that matches the one or more conditions, wherein the stored query filter further includes a condition fulfillment information (CFI) about relevant groups of DUs and irrelevant groups of DUs with respect to the at least one condition; wherein an irrelevant group of DUs is a group that definitely does not comprise, according to the CFI, any DU that fulfills the one or more conditions, and wherein a relevant group of DUs is a group that potentially includes at least one DU that fulfills the one or more conditions;
when the stored query filter is found:
(a) skip one or more irrelevant groups of DUs to be skipped during the responding to the query, without searching for DUs within the one or more irrelevant groups, for fulfillment of the one or more conditions;
(b) search, within one or more relevant groups of DUs for DUs that fulfill the one or more conditions;
wherein the one or more irrelevant groups of DUs and the one or more relevant groups of DUs belong to the multiple stored groups of DUs; and
(c) generate a response to the query based on an outcome of the searching.

* * * * *